US007707929B1

(12) United States Patent
Bourgeois et al.

(10) Patent No.: US 7,707,929 B1
(45) Date of Patent: *May 4, 2010

(54) OUTDOOR COOKING APPARATUS

(76) Inventors: Norman R Bourgeois, 712 St. George Ave., Jefferson, LA (US) 70121;
Michael P. Bourgeois, 2125 Kentucky Ave., Kenner, LA (US) 70062

(*) Notice: Subject to any disclaimer, the term of this patent is extended or adjusted under 35 U.S.C. 154(b) by 921 days.

This patent is subject to a terminal disclaimer.

(21) Appl. No.: 11/370,797

(22) Filed: Mar. 7, 2006

Related U.S. Application Data

(63) Continuation-in-part of application No. 10/862,553, filed on Jun. 7, 2004, now Pat. No. 7,237,476, and a continuation-in-part of application No. 10/862,601, filed on Jun. 7, 2004, now Pat. No. 7,325,482.

(60) Provisional application No. 60/659,129, filed on Mar. 7, 2005.

(51) Int. Cl.
  *A47J 37/00* (2006.01)
(52) U.S. Cl. .......................... 99/340; 99/482
(58) Field of Classification Search .............. 99/339, 99/340, 403–418, 426, 345–347, 481, 482, 99/357; 126/25 R, 9 R, 30, 40; 426/520–523
See application file for complete search history.

(56) References Cited

U.S. PATENT DOCUMENTS

| 5,665,258 A * | 9/1997 | Hsu ......................... 219/388 |
| 5,673,321 A * | 9/1997 | Lee ............................ 380/37 |
| 5,813,321 A * | 9/1998 | Bourgeois ................. 99/340 |
| 5,970,321 A * | 10/1999 | Hively ..................... 438/123 |
| 6,058,830 A * | 5/2000 | Bourgeois ................. 99/340 |
| 6,314,869 B1 * | 11/2001 | Bourgeois, Jr. ............ 99/340 |
| 6,439,107 B1 * | 8/2002 | Bourgeois ................. 99/340 |
| 6,698,335 B1 * | 3/2004 | Bourgeois ................. 99/340 |
| 7,237,476 B1 * | 7/2007 | Bourgeois et al. .......... 99/340 |
| 7,325,482 B1 * | 2/2008 | Bourgeois et al. .......... 99/340 |

* cited by examiner

*Primary Examiner*—Timothy F. Simone
(74) *Attorney, Agent, or Firm*—Garvey, Smith, Nehrbass & North, L.L.C.; Charles C. Garvey, Jr, (57) ABSTRACT

An improved outdoor cooking apparatus features a specially configured pot with multiple specially configured cooking inserts and burner frame that supports a burner element. One insert is a rack that can be used for cooking one or more whole poultry carcasses. Another insert is a perforated basket that can be used to hold items to be cooked. The pot has a lower tapered section that includes a tapering downwardly sidewall or walls meeting a smaller, generally rectangular bottom panel. The pot has an upper section with a larger transverse cross section than the pot bottom, preferably comprised of generally vertically oriented side all sections. The basket can be correspondingly shaped to the contour of the pot interior.

35 Claims, 6 Drawing Sheets

OUTDOOR COOKING APPARATUS

CROSS-REFERENCE TO RELATED APPLICATIONS

Priority of U.S. Provisional Patent Application Ser. No. 60/659,129, filed Mar. 7, 2005. This is a continuation-in-part of U.S. Ser. No. 10/862,553, filed Jun. 7, 2004 now U.S. Pat. No. 7,237,476 and U.S. Ser. No. 10/862,601, filed Jun. 7, 2004 now U.S. Pat. No. 7,325,482 each hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor cooking devices that are fueled with gaseous fuel (e.g. propane, butane) and more particularly to an improved outdoor cooking device that can be used in a number of different cooking situations including boiling, steaming, and with water or oil as a cooking medium. Even more particularly, the present invention relates to an improved cooking apparatus that has a specially shaped pot and one or more food holding inserts that can optionally be placed inside the pot. The inserts can include a specially configured insert can hold one or more entire poultry carcasses (e.g. turkey, chicken, etc.).

2. General Background of the Invention

A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters. Examples of these prior art type outdoor cooking devices can be seen in the brochure of Metal Fusion, Inc., of Jefferson, La. and at the website www.kingkooker.com.

Patents have issued naming Norman Bourgeois as inventor that relate to burners and related cooking apparatus. Examples include U.S. Pat. No. 5,065,735 for a "Convertible Burner Apparatus" that features different primary burner frames and legs that can elevate the burner frames. Other Bourgeois patents that relate to cooking devices include U.S. Pat. Nos. 5,813,321; 5,970,852; and 6,058,830; 6,314,869; 6,439,107; 6,698,335; 6,957,649; and 6,964,273, each said Bourgeois patent hereby incorporated herein by reference.

For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are apperturned longitudinally for receiving a knife to cut food within the tube member.

Patents issued to Barbour (U.S. Pat. Nos. 5,758,569 and 5,896,810) disclose a cooking apparatus directed to the frying of poultry items such as turkeys.

Various patents have issued for cooking vessels or pots. Examples include U.S. Pat. No. 1,276,749 entitled "Cooking Utensil." A similar device can be found in U.S. Pat. No. 1,488,150 entitled "Steaming and Draining Vessel."

A cooking rack is disclosed in U.S. Pat. No. 2,360,026. A combined cooker and steamer is seen in U.S. Pat. No. 2,555,720. An electrically heated boiler is seen in U.S. Pat. No. 3,859,505. The Lee U.S. Pat. No. 4,106,486 discloses a perforated inner pan that nests completely in a nonperforated open top pan. That U.S. Pat. No. 4,106,486 is entitled "Cooking Utensil."

The McLemore U.S. Pat. No. 6,711,992 discloses a fryer, boiler and steamer cooking apparatus.

Another frying apparatus shown in the Johnston Patent 2005/0051035.

Design Patents D226,940, D237,578, and D402,155 disclose various cookers or fryers.

BRIEF SUMMARY OF THE INVENTION

The present invention provides an improved outdoor cooking apparatus that includes a burner frame having upper and lower end portions, wherein the lower end portion is configured to engage an underlying support surface, the upper end portion providing a pot support.

A burner element is mounted on the frame for providing a flame to be used during cooking. A specially configured pot rests upon the pot support during cooking, the pot having a generally square or rectangular bottom panel of a first, smaller area, a plurality of sidewalls, an open top of a second, larger area, a pot rim, and an interior for holding a cooking fluid. The pot sidewalls include lower inclined walls that extend upwardly from the bottom panel.

One or more inserts or racks are provided that are sized and shaped to fit the pot interior. Each insert or rack optionally rests upon the pot bottom panel in a cooking position and can be attached to the pot rim in a draining position. One of the racks is a poultry cooking insert that can hold an entire poultry carcass (for example turkey, chicken, or a plurality of poultry carcasses). The rack preferably extends above the bottom panel when cooking and extends laterally beyond the bottom panel. This configuration is particularly useful when frying large poultry items (such as a turkey), minimizing the volume of frying medium (e.g. peanut oil) that is required.

Another rack that can be placed in a cooking medium within the pot interior is a perforated basket for frying items such as fish, poultry, vegetables or the like. Two frying baskets could be placed inside the pot in a side-by-side position or configuration.

The apparatus of the present invention can be used to steam items when a steamer plate is placed above and supported by the poultry cooking insert.

The present invention can be used with more than one cooking medium, such as with oil or with water. Water is preferably used when steaming, or when cooking certain seafood items that are boiled such as shrimp or crabs. An oil cooking medium is used when frying certain items such as poultry, fish, or vegetables.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 4:
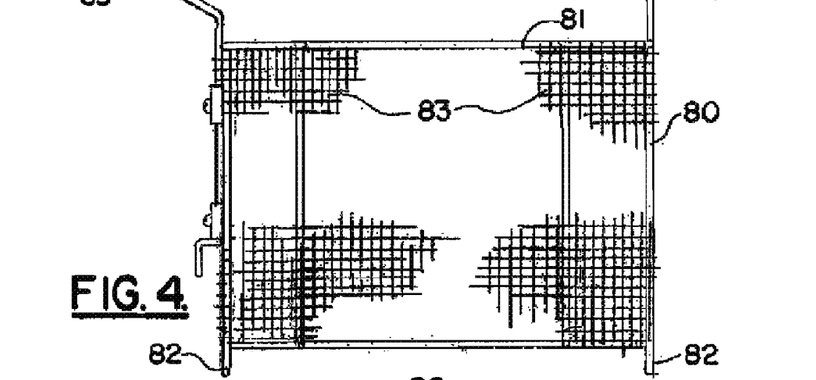
FIG. 4 is a partial side view of the preferred embodiment of the apparatus of the present invention illustrating the pot liner.
Figure 5:
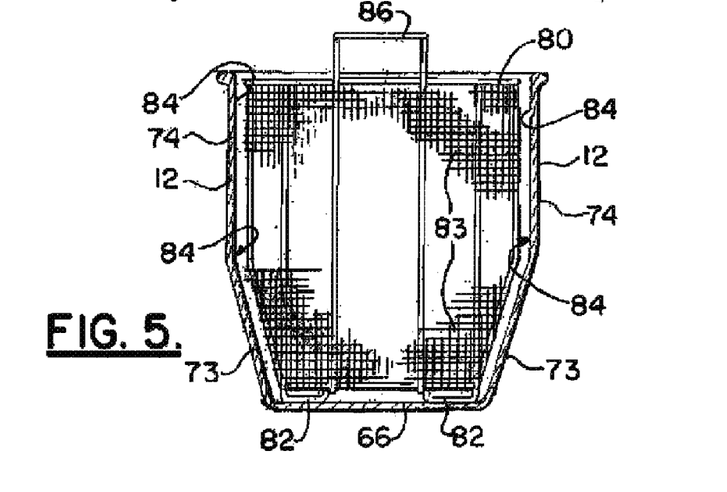
FIG. 5 is a partial end view of the preferred embodiment of the apparatus of the present invention illustrating the pot liner.
Figure 6:
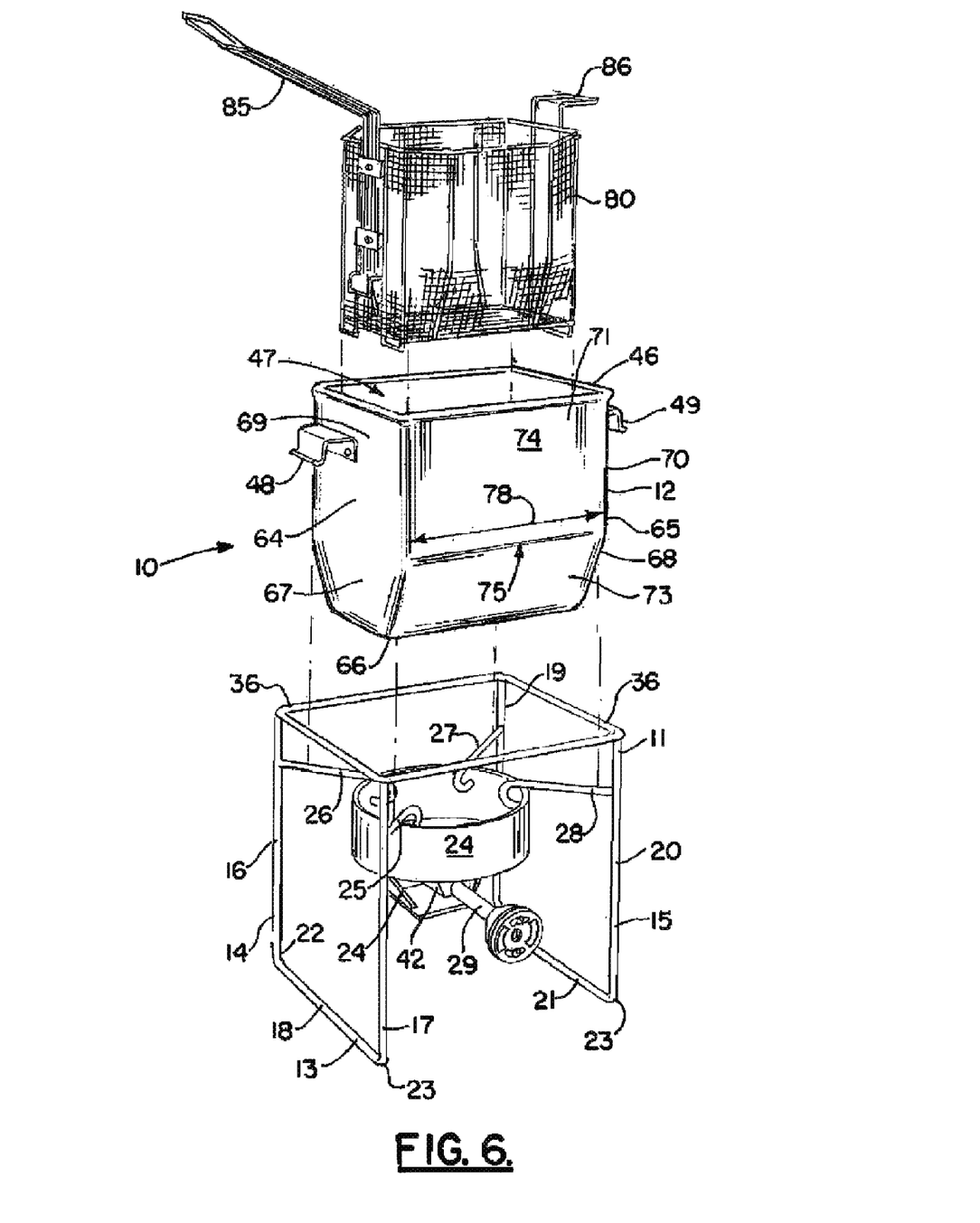
FIG. 6 is a perspective view of the preferred embodiment of the apparatus of the present invention.
Figure 7:
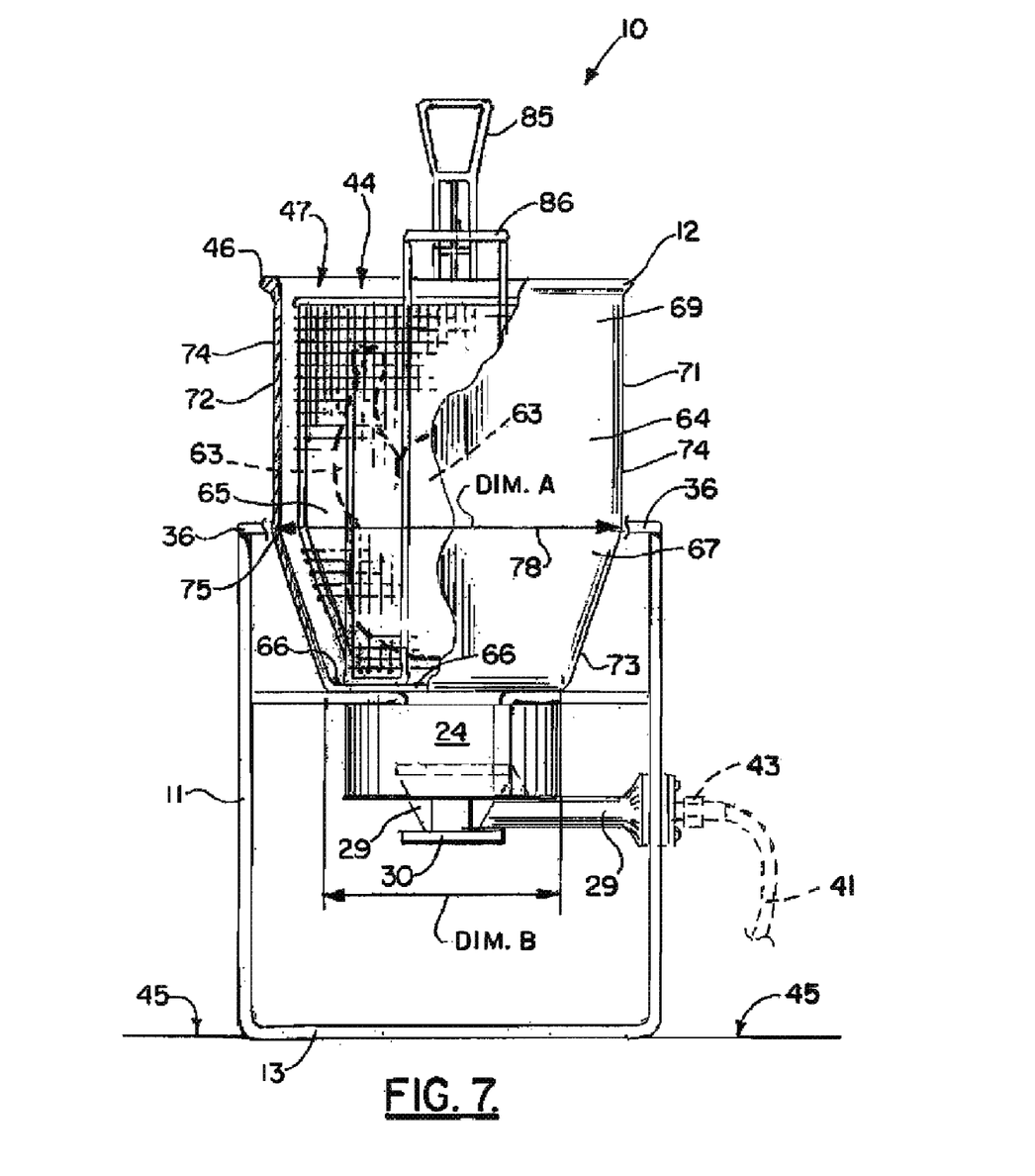
FIG. 7 is a partially broken away side elevation view of the preferred embodiment of the apparatus of the present invention.

FIGS. 1-7 show the preferred embodiment of the apparatus of the present invention which is designated by the numeral 10 in FIGS. 6 and 7. Outdoor cooking apparatus 10 provides a burner frame 11 for supporting a pot 12. The burner frame 11 has a base 13 for engaging an underlying support surface such as a concrete slab 45. Frame 11 includes a pair of unshaped legs 14, 15. The leg 14 is comprised of a pair of vertical sections 16, 17 connected to a horizontal section 18 at bends 22, 23. Similarly, leg 15 has a pair of spaced apart vertical sections 19, 20 connected to a horizontal section 21. Likewise, bends 22, 23 can be used to connect the horizontal section 21 to the vertical sections 19, 20.

Figure 1:
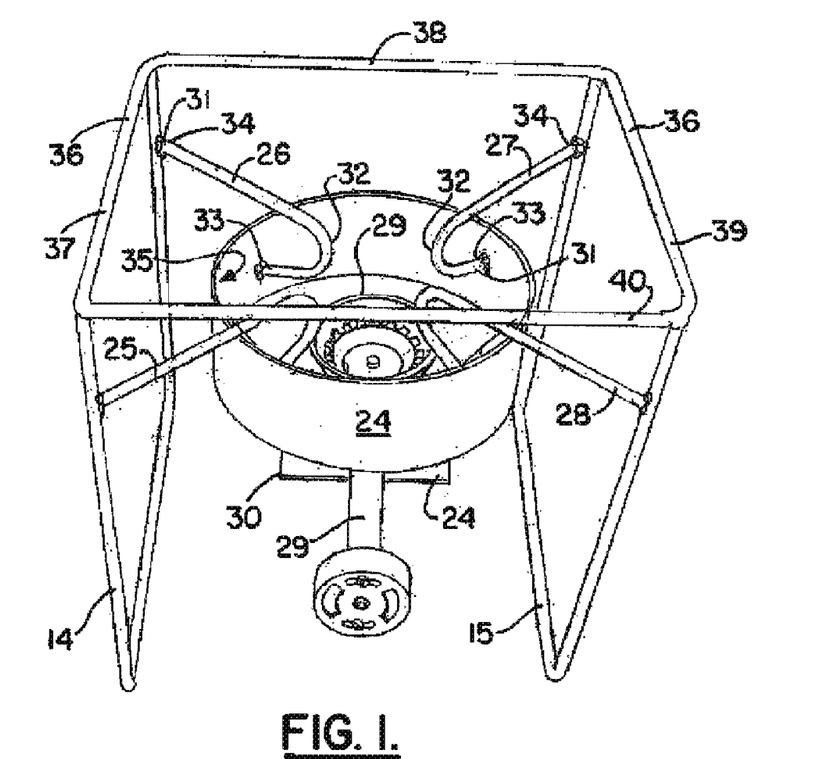
FIG. 1 is a perspective view of the preferred embodiment of the apparatus of the present invention.
Figure 2:
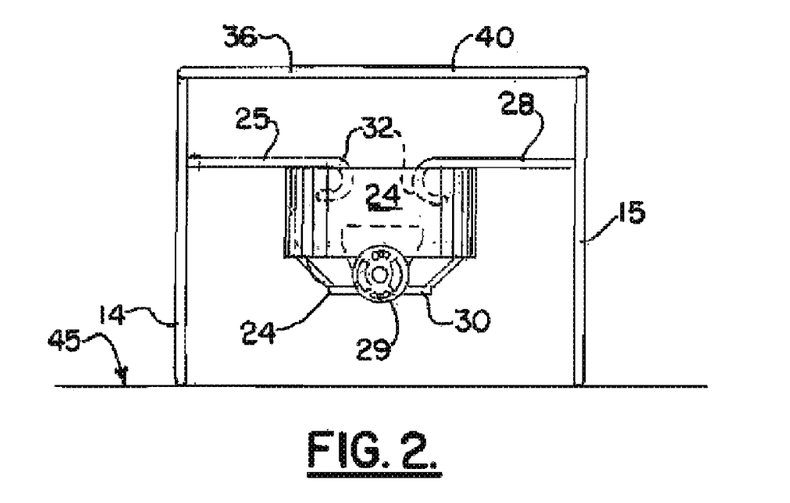
FIG. 2 is a partial front elevation view of the preferred embodiment of the apparatus of the present invention showing the pot.
Figure 3:
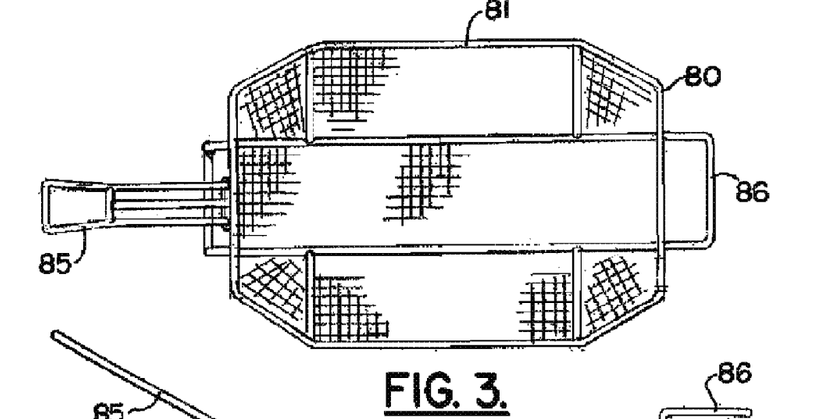
FIG. 3 is a top partial perspective view of the preferred embodiment of the apparatus of the present invention showing the pot liner.

A shroud or wind guard 24 is connected to each of the legs 14, 15 with a plurality of grate members 25, 26, 27, 28. A burner element 29 is supported just below the shroud 24. The shroud 24 can be generally cylindrically shaped as shown. A burner support bracket or bar 30 can be attached to the bottom of shroud 24 as shown in FIGS. 2 and 4. The burner support bar or bracket 30 can be used to support the burner element 29 near the bottom the shroud 24. Burner element 29 can be a commercially available element, and can be fastened at 42 (FIG. 6) to support bracket 30 using a bolted connection.

Each grate member 25, 26, 27, 28 can be generally hook shaped, providing a bend 32 that connects grate end portions 33, 34. The end portion 33 connects to shroud 24 with a connection such as a weld 31. The end portion 34 of each grate member 25, 26, 27, 28 connects to a leg 15 or 16 with a connection such as a weld 31. In the preferred embodiment, the connection of end 33 to shroud 24 can be a weld 31 to the inner cylindrical surface 35 of shroud 24.

Frame 11 includes a rectangular upper section 36. This rectangular upper section 36 can be defined by a plurality of four horizontal bars 37, 38, 39, 40. The bars 37, 38, 39, 40 can be welded end to end, or can be a single bent bar that forms a rectangle as shown in FIG. 5. The rectangular upper section 36 can then be welded to legs 14, 15 at the corners of rectangular upper support 36 as shown in FIG. 5.

Burner element 29 can be a commercially available cast iron burner element such as the type that are used in hot water heaters. These burner elements 29 can be either high pressure or low pressure depending upon the amount of heat that is to be generated during cooking. A fuel source such as a commercially available cannister of butane or propane can be used to fuel burner element 29, connected thereto using a hose 41, regulator (not shown), and an inlet fitting 43 in a manner that is known in the art.

In FIGS. 3-7, pot 12 includes a pot rim 46, a pot interior 47, a plurality of wall panels, and can include a liner 80. Handles 48, 49 can be welded to end panels 64, 65. When pot 12 has cooled, handles 48, 49 enable the pot 12 to be moved. Pot 12 includes bottom panel 66, end panels 64, 65 and side panels 71, 72. The pot 12 provides an open top 44 into which an item to be cooked (such as a poultry carcass 63) can be inserted.

End panels 64, 65 each include a lower trapezoid shaped section and an upper rectangularly shaped section. The end panel 64 has a lower trapezoid section 67 and an upper rectangular section 69. Similarly, the end panel 65 provides a lower trapezoid shaped section 68 and an upper rectangular section 70. Each side 71, 72 has an inclined lower panel 73 and an upper generally vertically oriented panel 74. A horizontal seam 75 defines the intersection between inclined panel 73 and vertical panel 74 for each side 71, 72.

In FIG. 7, the dimension "A" line 76 indicates the width of pot 12 at seams 75, measured from one seam 75 to the other seam 75. In FIG. 6, the dimension line 78 indicates the length of pot 12 at seam 75. The combination of the dimension lines 76 and 78 define a larger transverse cross sectional area of pot 12 next to the seams 75 that can be about equal to the area of open top 44. A second, smaller transverse cross sectional area is defined by bottom panel 66. During use, pot 12 is laterally restrained the bars 37, 38, 39, 40 of frame 11. The larger transverse cross sectional area of pot 12 at seams 75 as defined by dimension arrows 76 and 78 is positioned next to rectangular upper section 36.

This improved configuration places the larger transverse cross sectional area of the pot 12 next to rectangular upper section 36 to prevent or restrain lateral movement of the pot during cooking. The smaller bottom panel 66 in combination with the inclined panels 73 minimizes the volume of typically expensive cooking oil that is required for cooking the poultry carcass 63.

Figure 8:
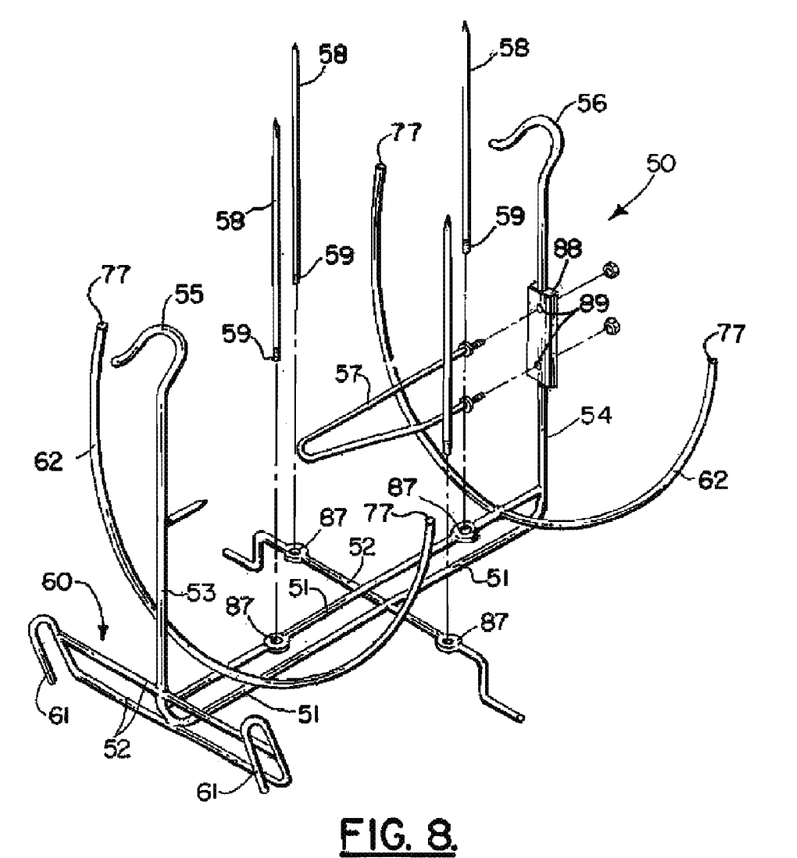
FIG. 8 is a partial perspective view of the preferred embodiment of the apparatus of the present invention showing the optional pot insert rack.

Different food holding inserts can be placed in pot 11, such as the rack insert 50 (FIGS. 8-11) or the basket 80 (FIGS. 3-7). Insert 50 is comprised of longitudinal beam or beams/members 51 and one or more transverse beams/members 52. Vertical beams 53, 54 have lifting hooks 55, 56 respectively. Beam 54 can have a thickened section 88 that provides openings 89 enabling skewer 57 to be bolted to member 54 as shown in FIG. 8.

One or more generally vertically oriented skewers 58 can be removably (e.g. threaded connection) attached to beam 52 at internally threaded opening 87. Each skewer 58 has a threaded lower end 59 with threads that engage correspond threads of an opening 87. When attached to openings 59, the skewers 58 can be used to support one or more smaller poultry carcasses (e.g. chickens) 63 (see FIG. 9). In this fashion, either skewer 57 or skewers 58 can be attached to rack 50. Skewer 57 is typically used to skewer a horizontally positioned turkey or other larger poultry carcass 63 by occupying a part of its body cavity.

Curved supports 62 help cradle and support a turkey or poultry carcass 63 during cooking when insert 50 rests upon bottom panel 66 of the pot 12. Spaced apart curved members 62 enable a larger poultry carcass (e.g. turkey) 63 to be supported as the carcass 63 rests in a horizontal position upon members 51 and cradled by curved members 62. Hanger 60 can be formed using a pair of transverse beams 52 and preferably two spaced apart, downwardly extending hooks 61 that connect to beams 52 as shown in FIG. 4. Hooks 61 engage a pot end panel 64 or 65 at the periphery next to open top 44 when a poultry carcass is to be drained of excess oil after cooking.

An elongated bar (not shown) can engage hooks 55, 56 and thus be used to lift insert 50 and carcass 63 from pot 12 after cooking in a selected cooking medium (e.g. peanut oil). For draining, insert 50 can be centered roughly over bottom panel 66 but at an elevated position on rim 46 next to open top 44 wherein hanger 60 hooks 61 engage the upper edge of an end panel 64 or 65. Hooks 61 can be mounted at an angle relative to beams 51 so that the carcass 63 is positioned to drain excess cooking oil back into the pot 12 when rack 50 is attached to pot 12 at pot rim 46.

Figures 9, 10, 11:
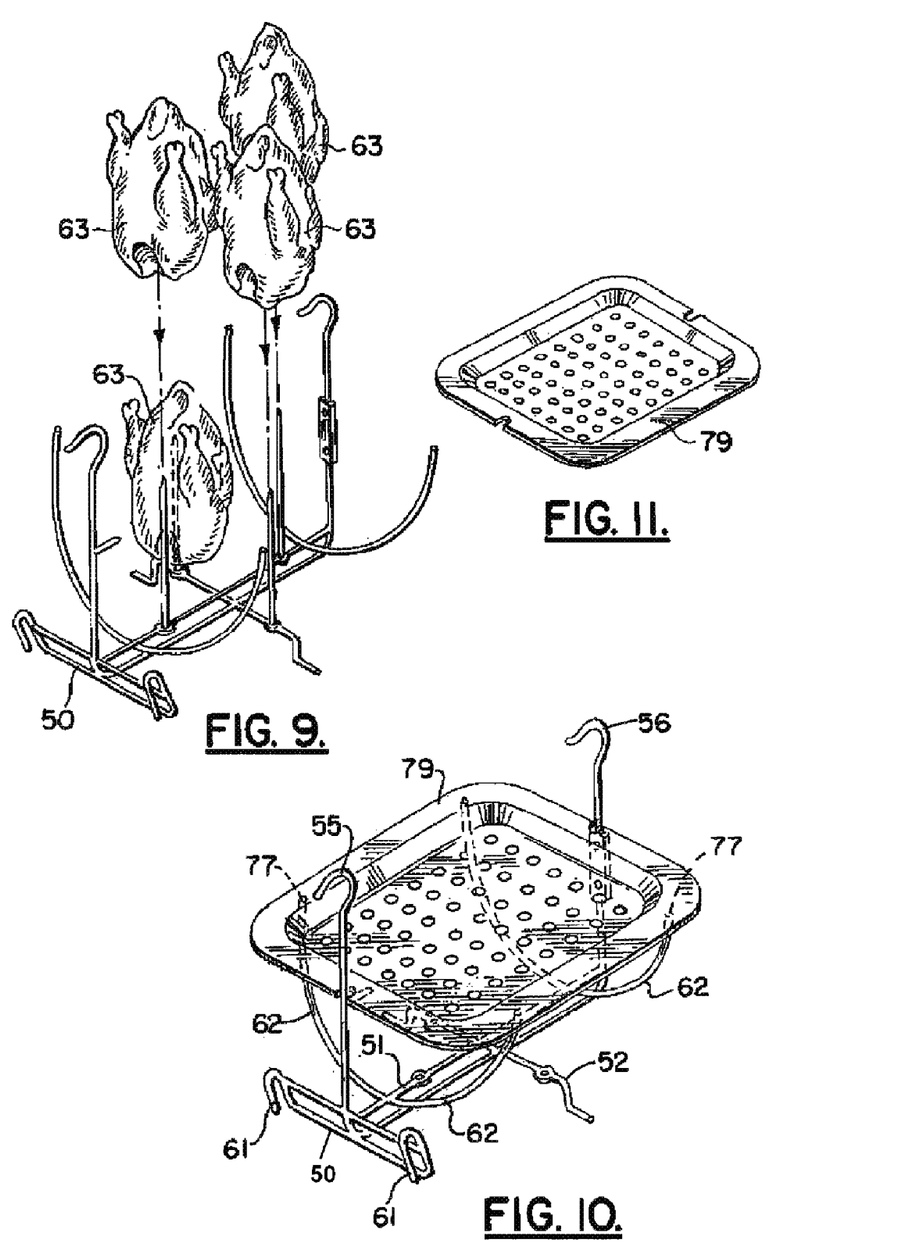
FIG. 9 is a partial perspective view of the preferred embodiment of the apparatus of the present invention showing the optional pot insert rack.
FIG. 10 is a partial perspective view of the preferred embodiment of the apparatus of the present invention showing the optional pot insert rack.
FIG. 11 is a partial perspective view of the preferred embodiment of the apparatus of the present invention showing the steamer plate that can optionally be used with the rack of FIGS. 8-10.

FIGS. 10 and 11 show an optional perforated steamer plate 79 that rests upon the upper ends 77 of curved members 62 and in between vertical members 53, 54 (see FIG. 11). Items to be steamed can be placed upon plate 79 and a water level maintained in pot 12 that is below the level of plate 79.

Another food holding insert 80 can be employed with pot 12 instead of or interchangeably with insert 50. Insert 80 is a wire basket shape to conform to the contour 84 of the pot interior. The wire frame 81 can be shaped to conform to the inside contour 84 of pot 12, then covered with wire cloth 83 so that basket insert 80 will hold food items such as a poultry carcass 63. Basket insert 80 can be provided with feet 82 that space the wire cloth 83 (and any contained food item) away from pot bottom 66. Basket 80 can be lifted and manipulated using handles 85, 86.

The following is a list of suitable parts and materials for the various elements of the preferred embodiment of the present invention.

| PARTS LIST | |
|---|---|
| Parts Number | Description |
| 10 | outdoor cooking apparatus |
| 11 | burner frame |
| 12 | pot |
| 13 | base |
| 14 | u-shaped leg |
| 15 | u-shaped leg |
| 16 | vertical section |
| 17 | vertical section |
| 18 | horizontal section |
| 19 | vertical section |
| 20 | vertical section |
| 21 | horizontal section |
| 22 | bend |
| 23 | bend |
| 24 | shroud |
| 25 | grate member |
| 26 | grate member |
| 27 | grate member |
| 28 | grate member |
| 29 | burner element |
| 30 | burner support bracket |
| 31 | weld |
| 32 | bend |
| 33 | end portion |
| 34 | end portion |
| 35 | inner cylindrical surface |
| 36 | rectangular upper section |
| 37 | horizontal bar |
| 38 | horizontal bar |
| 39 | horizontal bar |
| 40 | horizontal bar |
| 41 | hose |
| 42 | bolted connection |
| 43 | fitting |
| 44 | open top |
| 45 | concrete slab |
| 46 | pot rim |
| 47 | pot interior |
| 48 | handle |
| 49 | handle |
| 50 | poultry cooking insert |
| 51 | longitudinal beam |
| 52 | transverse beam |

-continued

PARTS LIST

| Parts Number | Description |
|---|---|
| 53 | vertical beam |
| 54 | vertical beam |
| 55 | lifting hook |
| 56 | lifting hook |
| 57 | poultry skewer |
| 58 | Poultry skewer |
| 59 | threaded end |
| 60 | hanger |
| 61 | hook |
| 62 | curved member |
| 63 | poultry carcass |
| 64 | end panel |
| 65 | end panel |
| 66 | bottom panel |
| 67 | trapezoid section |
| 68 | trapezoid section |
| 69 | rectangular section |
| 70 | rectangular section |
| 71 | side |
| 72 | side |
| 73 | inclined panel |
| 74 | vertical panel |
| 75 | horizontal seam |
| 76 | dimension |
| 77 | end |
| 78 | dimension |
| 79 | steamer plate |
| 80 | basket |
| 81 | frame |
| 82 | foot |
| 83 | wire cloth |
| 84 | inside contour |
| 85 | handle |
| 86 | handle |
| 87 | internally threaded opening |
| 88 | thickened section |
| 89 | opening |

The foregoing embodiments are presented by way of example only; the scope of the present invention is to be limited only by the following claims.

The invention claimed is:

1. An outdoor cooking apparatus comprising:
a) a burner frame having upper and lower end portions, the lower end portion being configured to engage an underlying support surface and a pot support;
b) a burner element mounted on the frame;
c) a pot that rests upon the pot support during cooking, the pot having a bottom panel of a first area, a plurality of sidewalls, an open top of a second area, an interior for holding a cooking fluid, and a pot rim;
d) a plurality of said sidewalls having a trapezoid shaped lower section that provides a smaller lower wall end portion and a larger upper wall end portion and some of the wall sections have lower inclined wall sections that forms an obtuse angle with an upper wall section that is above the inclined wall section, and a seam defines the intersection of inclined lower and upper wall sections;
e) multiple food holding inserts that are sized and shaped to fit the pot interior, wherein a first said insert rests upon the pot bottom panel in a cooking position and a second insert is supported by the first insert in an elevated position spaced above the pot bottom;
f) the first insert having multiple upwardly projecting skewers, each skewer being sized and shaped to hold a poultry carcass, the second insert including a perforated portion that enables food items placed on the first insert to be steamed, wherein the perforated portion is positioned at an elevation above the skewers; and
g) wherein the frame has a peripheral member that surrounds the pot.

2. The outdoor cooking apparatus of claim 1 wherein the first insert has one or more hangers that extend upwardly, enabling the first insert to be lifted.

3. The outdoor cooking apparatus of claim 1 wherein at least a plurality of the pot sidewalls have a lower inclined pot sidewall section and an upper vertical sidewall section.

4. The outdoor cooking apparatus of claim 2 wherein at least a plurality of the pot sidewalls have a lower inclined pot sidewall section and an upper vertical sidewall section.

5. The outdoor cooking apparatus of claim 1 wherein the first insert has opposed end portions and a insert lifting member at each insert end portion.

6. The outdoor cooking apparatus of claim 1 wherein one of the skewers extends generally horizontally.

7. The cooking apparatus of claim 1 further comprising a steamer plate.

8. The cooking apparatus of claim 7 wherein the second insert is a steamer plate is supported above the pot bottom panel during use.

9. The cooking apparatus of claim 5 wherein multiple of the skewers are generally vertically oriented.

10. The cooking apparatus of claim 1 wherein the first insert has longitudinal and transverse portions.

11. The cooking apparatus of claim 1 wherein the burner frame pot support includes a retainer that laterally restrains the pot at a position next to a pot maximum transverse cross sectional area.

12. The cooking apparatus of claim 1 wherein the burner frame has a plurality of legs.

13. The cooking apparatus of claim 1 wherein the peripheral member is generally rectangular.

14. The cooking apparatus of claim 1 wherein the burner frame has a footprint defining a rectangular base and includes plurality of legs that span between the base and the pot support.

15. The cooking apparatus of claim 1 wherein the pot has four upper rectangular sidewall sections, two lower trapezoid sidewall sections and two lower, inclined rectangular sidewall sections.

16. The cooking apparatus of claim 1 wherein the burner frame includes a shroud that generally surrounds the burner element.

17. The cooking apparatus of claim 14 wherein the burner frame includes a shroud that generally surrounds the burner element.

18. The cooking apparatus of claim 15 wherein the burner frame includes a shroud that generally surrounds the burner element.

19. An outdoor cooking apparatus comprising:
a) a burner frame having upper and lower end portions, the lower end portion being configured to engage an underlying support surface the upper end portion providing a barrier that restrains lateral pot movement and a pot support spaced below the pot barrier;
b) a burner element mounted on the frame;
c) a pot that rests upon the pot support during cooking, the pot having a bottom panel, a plurality of sidewalls, an open top, an interior for holding a cooking fluid, and a pot rim;
d) a plurality of food holding inserts that are each sized and shaped to fit the pot interior;

e) wherein a first one of the food holding inserts is a poultry holding insert that has a plurality of skewers thereon, said first inert being sized and shaped to rest upon the pot bottom; and f) a second food holding insert being supported by the first insert in an elevated position spaced above the pot bottom, said second insert including a perforated portion that enables food items placed on the perforated portion to be steamed, wherein the perforated portion is positioned above the skewers.

20. The outdoor cooking apparatus of claim 19 wherein two of the pot sidewalls have an inclined wall section.

21. The outdoor cooking apparatus of claim 19 wherein at least a plurality of the pot sidewalls have a lower inclined pot sidewall section and an upper, generally vertical pot sidewall section.

22. The outdoor cooking apparatus of claim 20 wherein at least two of the pot sidewalls has an upper, generally vertical pot sidewall section.

23. The outdoor cooking apparatus of claim 19 wherein the first insert is a rack that has first and second rack end portions and a rack lifting member at each rack end portion.

24. The outdoor cooking apparatus of claim 23 wherein each skewer for supporting a skewered poultry item.

25. The cooking apparatus of claim 24 wherein at least one skewer extends generally horizontally from the rack.

26. The cooking apparatus of claim 23 wherein the second insert is a steamer plate that removably attaches to the rack.

27. The cooking apparatus of claim 26 wherein the steamer plate is supported above the pot bottom panel.

28. The cooking apparatus of claim 26 wherein the steamer plate has about the same dimensions as the pot bottom panel.

29. The cooking apparatus of claim 19 further comprising a third insert that can be selectively used in place of the first and second insert, the third insert being a perforated basket.

30. The cooking apparatus of claim 19 wherein the barrier that laterally restrains the pot is comprised of a member that generally surrounds and closely conforms to the pot at a position between the upper and lower end portions of the frame.

31. The cooking apparatus of claim 19 wherein the burner frame has a plurality of legs.

32. The cooking apparatus of claim 19 wherein the burner frame includes rectangular base and a plurality of legs that span between the base and the pot support.

33. The cooking apparatus of claim 19 wherein the pot stores in a stored position within the frame, wherein the legs extend along the sidewalls of the pot.

34. The cooking apparatus of claim 19 wherein the burner frame includes a shroud that generally surrounds the burner element.

35. The cooking apparatus of claim 33 wherein the burner frame includes a shroud that generally surrounds the burner element.

* * * * *